(12) United States Patent
Nishiyama et al.

(10) Patent No.: US 10,047,888 B2
(45) Date of Patent: Aug. 14, 2018

(54) QUICK CONNECTOR

(71) Applicant: Sumitomo Riko Company Limited, Komaki-shi, Aichi (JP)

(72) Inventors: Takahiro Nishiyama, Inazawa (JP); Kazuki Hatanaka, Kasugai (JP); Hisashi Terayama, Kasugai (JP); Soutaro Kumeno, Nagoya (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 777 days.

(21) Appl. No.: 14/699,628

(22) Filed: Apr. 29, 2015

(65) Prior Publication Data

US 2015/0240978 A1 Aug. 27, 2015

Related U.S. Application Data

(63) Continuation of application No. PCT/JP2014/067638, filed on Jul. 2, 2014.

(30) Foreign Application Priority Data

Aug. 5, 2013 (JP) .................................. 2013-162606

(51) Int. Cl.
F16L 37/088 (2006.01)
F16L 21/03 (2006.01)
(Continued)

(52) U.S. Cl.
CPC ............. *F16L 37/088* (2013.01); *F16L 21/03* (2013.01); *F16L 21/08* (2013.01); *F16L 37/1225* (2013.01); *F16L 2201/10* (2013.01)

(58) Field of Classification Search
CPC ..... F16L 37/088; F16L 37/1225; F16L 21/03; F16L 21/08
See application file for complete search history.

(56) References Cited

U.S. PATENT DOCUMENTS 8,408,604 B2 4/2013 Yamada et al.
8,596,690 B2 12/2013 Yamada et al.
(Continued)

FOREIGN PATENT DOCUMENTS

DE 102006047267 A1 4/2008
EP 2076705 B1 2/2011
(Continued)

OTHER PUBLICATIONS

Mar. 22, 2017 Office Action issued in German Patent Application No. 112014003608.0.
(Continued)

*Primary Examiner* — James M Hewitt, II
(74) *Attorney, Agent, or Firm* — Oliff PLC

(57) ABSTRACT

A quick connector, which can securely demonstrate the lock confirmation function by a checker when a piped body is reinserted, is provided. A checker includes reinsertion-inhibiting bosses. Thus, when a piped body is inserted through an opening of a retainer again in such a state as the checker is moved to the lock confirmation position after the piped body has been pulled from out of a housing and the retainer in such a state as the checker is moved to the release position, the reinsertion-inhibiting bosses hock up onto an annular boss, thereby inhibiting the piped body from being inserted into the retainer and housing.

6 Claims, 20 Drawing Sheets

(51) Int. Cl.
*F16L 21/08* (2006.01)
*F16L 37/12* (2006.01)

(56) References Cited

U.S. PATENT DOCUMENTS

| | | | | |
|---|---|---|---|---|
| 2010/0052315 | A1* | 3/2010 | Kerin | F16L 37/144 |
| | | | | 285/148.21 |
| 2012/0161435 | A1 | 6/2012 | Yamada et al. | |
| 2013/0147187 | A1 | 6/2013 | Yamada et al. | |
| 2014/0319820 | A1* | 10/2014 | Takimoto | F16L 37/088 |
| | | | | 285/148.21 |

FOREIGN PATENT DOCUMENTS

| | | |
|---|---|---|
| EP | 2543917 A1 | 1/2013 |
| JP | 4937426 B1 | 5/2012 |
| JP | 5091952 B2 | 12/2012 |
| WO | 2008/040429 A1 | 4/2008 |
| WO | 2012/043024 A1 | 4/2012 |

OTHER PUBLICATIONS

Sep. 30, 2014 International Search Report issued in Application No. PCT/JP2014/067638.

* cited by examiner

QUICK CONNECTOR

CROSS REFERENCE TO RELATED APPLICATIONS

This is a continuation of Application No. PCT/JP2014/067638, filed on Jul. 2, 2014, which is incorporated herein by reference. The present invention is based on Japanese Patent Application No. 2013-162606, filed on Aug. 5, 2013, the entire contents of which are incorporated herein by reference.

BACKGROUND OF THE INVENTION

1. Field of the Invention

The present invention relates to a quick connector.

2. Description of the Related Art

In a quick connector set forth in Patent Literature No. 1, a checker is moved from the initial position to the lock confirmation position by a push-in operation, thereby confirming whether an annular boss of a piped body is put in such a state as being locked to a retainer. In addition, in that quick connector, the checker is moved from the lock confirmation position to the release position by a further push-in operation, thereby canceling the locking of the retainer to the annular boss of the piped body. That is, in such a state as the checker is moved to the release position, it is possible to pull the piped body from out of the retainer and eventually from out of a housing.

Patent Literature No. 1: Japanese Patent Gazette No. 4937426

SUMMARY OF THE INVENTION

However, in such a state as the checker is placed at the lock confirmation position after the piped body has been pulled from out of the retainer and housing, the quick connector comes to be put in such a state as it is possible to insert the piped body again into the retainer. On this occasion, since an operator or worker does not carry out an operation for moving the checker from the initial position to the lock confirmation position, the quick connector does not demonstrate the lock confirmation function.

The present invention has been done in view of such circumstances. Accordingly, it is an object to provide a quick connector that can securely demonstrate the lock confirmation function by a checker when a piped body is reinserted.

A quick connector according to the present invention is a quick connector to be coupled together with a piped body which is provided with an annular boss on a leading-end side thereof, and comprises: a tubular housing; a retainer formed integrally with or coupled together with said housing, the retainer locking to the annular boss of said piped body, which is inserted into the retainer through an opening thereof, thereby inhibiting said piped body from coming off; and a checker not only moved from an initial position to a lock confirmation position by a push-in operation, thereby confirming whether the annular boss of said piped body is put in a state of being locked to said retainer; but also moved from the lock confirmation position to a release position by a further push-in operation, thereby canceling the locking of said retainer to the annular boss.

Moreover, said checker includes a reinsertion-inhibiting boss.

In addition, the reinsertion-inhibiting boss is hooked up onto the annular boss when said piped body is inserted through the opening of said retainer again in such a state as said checker is moved to the lock confirmation position, after said piped body has been pulled from out of said housing and said retainer in such a state as the checker is moved to the release position, thereby inhibiting said piped body from being inserted into said retainer and said housing; and is free of hooking up onto the annular boss in such a state as said checker is placed at the initial position and at the release position, thereby being free of inhibiting the insertion or pullout of said piped body into or from out of said housing and said retainer.

In accordance with the aforementioned quick connector, the reinsertion-inhibiting boss inhibits the insertion of the piped body if the checker is in such a state as it is placed at the lock confirmation position, when the piped body is reinserted. Therefore, it is possible to prompt an operator or worker to move the checker to the initial position temporarily or once. Moreover, the lock confirmation function by the checker is demonstrated in case of reinserting the piped body, after the checker has been moved to the initial position, in the same manner as the original or initial insertion.

Hereinafter, suitable modes for the quick connector according to the present invention will be explained.

Preferably, said retainer can include: a retainer body having a first locker portion; and a retainer diametrically-enlarging claw disposed on an opening side of said retainer beyond the first locker portion of said retainer body, formed as a letter-"C" configuration being able to enlarge diametrically by elastic deformation, enlarging diametrically to make the annular boss of said piped body passable therethrough, and restoring the configuration to lock to the annular boss in the axial direction after the annular boss of said piped body has passed therethrough; and said reinsertion-inhibiting boss can be arranged on an opening side of said retainer beyond the retainer diametrically-enlarging claw.

Thus, the annular boss of the piped body contacts the reinsertion-inhibiting boss before the annular boss of the piped body arrives at the position of the retainer diametrically-enlarging claw. Therefore, the reinsertion of the piped body is inhibited securely in such a state as the checker is placed at the lock confirmation position.

Preferably, said retainer can further include an opening-end seat member forming the opening through which said piped body is inserted; and said reinsertion-inhibiting boss can be arranged in a middle axially between said retainer diametrically-enlarging claw and the opening-end seat member.

Thus, the flexure or deflection of the reinsertion-inhibiting boss in the axial direction is inhibited by the retainer diametrically-enlarging claw and opening-end seat member. Therefore, the reinsertion of the piped body is inhibited securely in such a state as the checker is placed at the lock confirmation position.

Preferably, said checker can further include a pair of clearance-intervention members intervening in an axial clearance between said retainer diametrically-enlarging claw and said opening-end seat member in such a state as said checker is placed at the lock confirmation position, thereby inhibiting said retainer diametrically-enlarging claw from deforming axially; and said reinsertion-inhibiting boss can be disposed respectively so as to protrude from opposite-face sides of the paired clearance-intervention members to oppositely-facing sides thereof.

The annular boss of the piped body acts a force on the retainer diametrically-enlarging claw to deform it toward the opening side in a case where a pullout force acts on the piped body after the piped body has been inserted into the retainer normally. However, the retainer diametrically-enlarging claw is inhibited from deforming toward the opening side by the presence of the paired clearance-intervention members. Moreover, the paired clearance-intervention members are utilized to dispose the reinsertion-inhibiting boss.

Preferably, said retainer body can include a stopper inhibiting a distance between opposite faces of said paired clearance-intervention members from enlarging. Inhibiting the distance between the opposite faces of the paired clearance-intervention members from enlarging leads to, as a consequence, inhibiting the reinsertion-inhibiting boss from escaping or running away toward the outer side diametrically. Therefore, the reinsertion of the piped body is inhibited securely, because the reinsertion-inhibiting boss is inhibited from escaping or running away toward the outside diametrically after the annular boss of the piped body has contacted the reinsertion-inhibiting boss.

Preferably, said retainer body can further include a second locker portion. Said checker can further include a checker axially-deforming claw that is formed on a counter side against the opposite faces of said paired clearance-intervention members by way of a slit; which is formed to be able to undergo flexure or deflection deformation axially on a leading-end side thereof; which is inhibited from undergoing the flexure or deflection deformation by said retainer diametrically-enlarging claw in such a state as said retainer diametrically-enlarging claw is enlarged diametrically, thereby maintaining such a state as being locked to the second locker portion of said retainer body; which is locked to the second locker portion of said retainer body, thereby being inhibited from moving from the initial position to the lock confirmation position in relative to the retainer body; and which turns into being able to cancel the locking to the second locker portion of said retainer body in such a state as said retainer diametrically-enlarging claw has restored the configuration, thereby being able to move from the initial position to the lock confirmation position in relative to the retainer body.

The checker axially-deforming claw upgrades the lock confirmation function. Moreover, forming the reinsertion-inhibiting boss and paired clearance-intervention members at an axial part where the checker axially-deforming claw is formed leads to making it possible to intend downsizing in the axial direction.

BRIEF DESCRIPTION OF THE DRAWINGS

DETAILED DESCRIPTION OF THE PREFERRED EMBODIMENTS (1) Outline of Quick Connector The outline of a quick connector 1 according to one of the present embodiments will be explained with reference to FIG. 1 through FIG. 3. As illustrated in FIG. 1, the quick connector 1 is used for constructing automotive piping, for instance. That is, the quick connector 1 forms a flow passage for distributing fuel, for instance. The quick connector 1 couples a resinous tube (not shown in the drawings) together with a piped body 3 (shown in FIG. 24).

Figure 1:
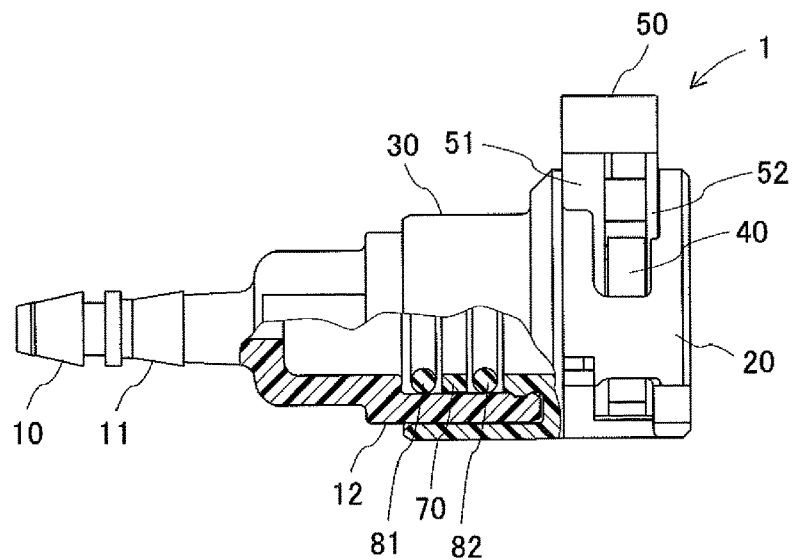
FIG. 1 is a front-view diagram of a quick connector (i.e., a diagram viewed from the axially right-angle direction), part of which is illustrated as the cross-sectional diagram.

The quick connector 1 is constructed to comprise a housing 10, a retainer 20, a checker 50, a collar 70, and annular sealing members (81, 82).

The housing 10 is made of glass-fiber reinforced polyamide, for instance, and is formed integrally as a penetrated tubular shape. Note that, although the housing 10 shown in FIG. 1 and FIG. 2 takes on a configuration formed to be penetrated linearly, it is also allowable that, in addition to the above, it can be formed so that the resulting flow passage is formed to be penetrated as a bent configuration, such as a "letter-'L' type," for instance.

Figure 2:
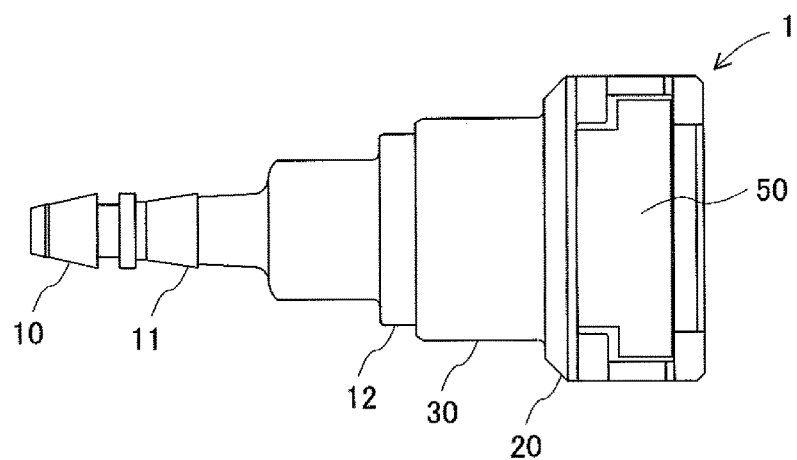
FIG. 2 is a diagram viewed from the above in FIG. 1 (i.e., a plan-view diagram)
Figure 3:
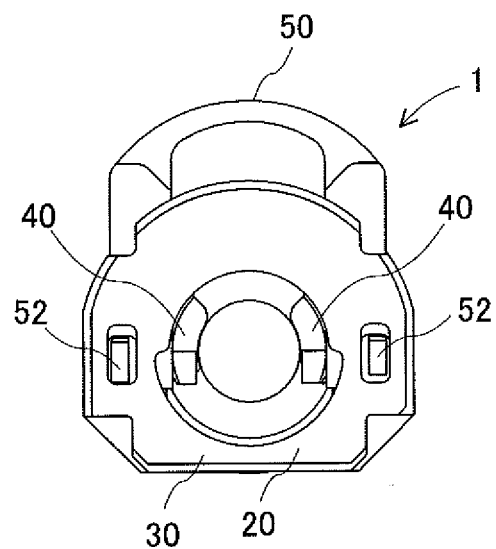
FIG. 3 is a diagram viewed from the right in FIG. 1 (i.e., a diagram viewed from the axial direction)

As illustrated in FIG. 1 and FIG. 2, a tube-connection portion 11, which is connected with the resinous tube (not shown in the drawings), is disposed on one of the opposite-end sides of the housing 10 (i.e., on the left side in FIG. 1 and FIG. 2). The outer peripheral face of the tube-connection portion 11 is formed as a stepped shape toward the axial direction in order to keep the resinous tube in the state of being fitted into lest it should come off.

Meanwhile, a pipe-insertion portion 12, which is formed to open so as to make the leading end of the piped body 3 (shown in FIG. 24) insertable thereinto, is disposed on another one of the opposite-end sides of the housing 10 (i.e., on the right side in FIG. 1 and FIG. 2). On the inner-peripheral side of the pipe-insertion portion 12, the annular sealing members (81, 82), which are made of fluororubber, for instance, and the collar 70, which is made of resin, are accommodated so as to interpose the collar 70 between the annular sealing members (81, 82) in the axial direction. The leading end of the piped body 3 comes to be inserted into these on their inner-peripheral sides.

As illustrated in FIG. 1 and FIG. 2, the retainer 20 is made of glass-fiber reinforced polyimide, for instance, and is formed integrally as a tubular shape virtually. Along with being coupled together with the housing 10 on the side of the pipe-insertion portion 12, the retainer 20 is locked to an annular boss 3a (shown in FIG. 24) of the piped body 3. Moreover, onto the retainer 20, the checker 50 is disposed movably in the diametric direction of the retainer. The piped body 3 is formed herein as a tubular shape, and is equipped with the annular boss 3a (shown in FIG. 24), which is formed to protrude to the outside in the diametric direction, at a position separated off at a distance from the leading end in the axial direction.

That is, the retainer 20 enables the piped body 3 to be inserted through the opening (or from the right side in FIG. 1 and FIG. 2), and then inhibits the piped body 3 from coming off by locking to the annular boss 3a of the inserted piped body 3. In addition, the retainer 20 makes it also possible to put the piped body 3, which has been inserted temporarily or once, in a state, which enables the piped body 3 to be pulled out, by canceling the locking to the annular boss 3a of the piped body 3.

The checker 50 is made of glass-fiber reinforced polyamide, for instance, and is a member for confirming whether the annular boss 3a of the piped body 3 is put in a state where it has been locked to the retainer 20. Since another section is provided hereinbelow to explain this checker 50 in detail, a summary of the checker 50 will be hereinafter explained in the present section.

Figure 33:
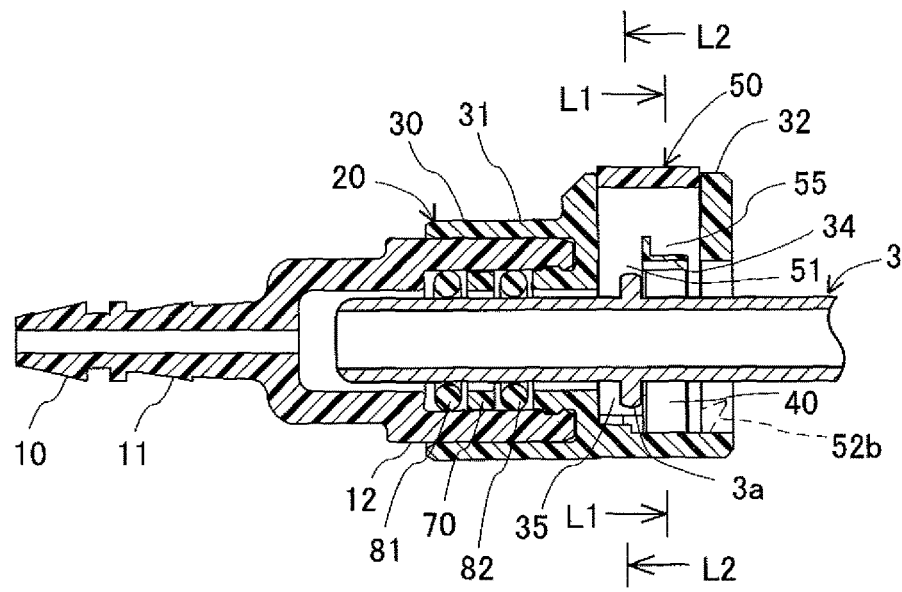
FIG. 33 illustrates an axial cross-sectional diagram of the quick connector in such a state as the checker is placed at the lock confirmation position (i.e., a completed state of the lock confirmation)
Figure 34:
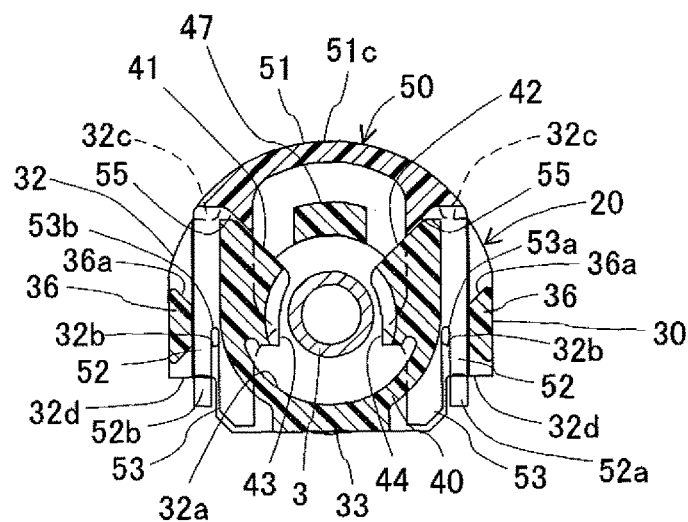
FIG. 34 is a cross-sectional diagram taken along the "L1"-"L1" line in FIG. 33, and illustrates such a state as the retainer diametrically-enlarging elastic-deformation claw is not enlarged diametrically (i.e., the completed state of the lock confirmation)
Figure 35:
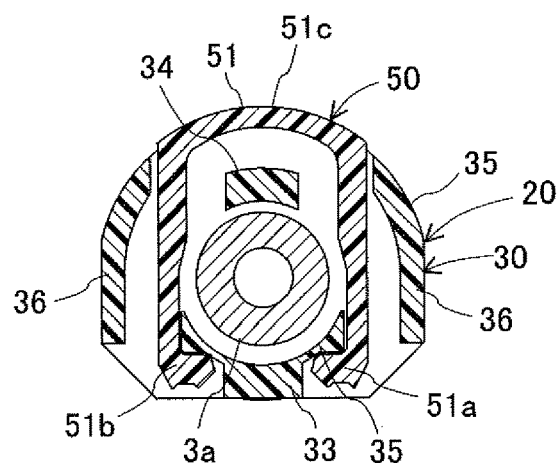
FIG. 35 is a cross-sectional diagram taken along the "L2"-"L2" line in FIG. 33, and illustrates such a state as the checker diametrically-enlarging elastic-deformation claw is not enlarged diametrically (i.e., the completed state of the lock confirmation)
Figure 36:
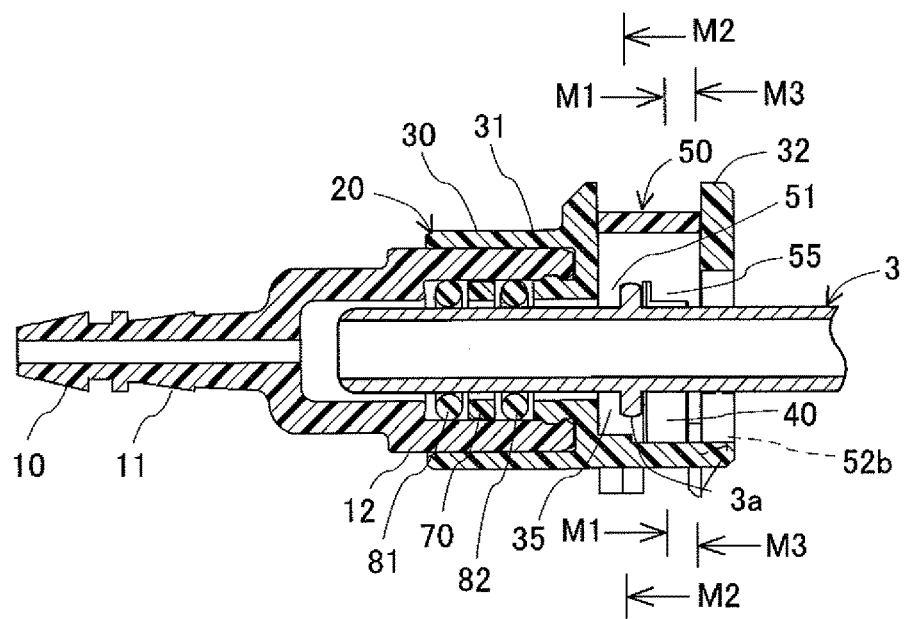
FIG. 36 is an axial cross-sectional diagram of the quick connector in such a state as the checker is further pushed in from the lock confirmation position to be placed at a third position (i.e., a state as the piped body is pulled out)

The checker 50 moves from the initial position in relative to the retainer 20 (i.e., the position shown in FIG. 20 through FIG. 23) in the diametrically press-in direction in relative to the retainer 20 (i.e., in the downward direction in FIG. 1 and FIG. 20), and then arrives at the lock confirmation position (i.e., the position shown in FIG. 33 through FIG. 35). An operator or worker can confirm by that movement of the checker 50 whether the annular boss 3a of the piped body 3 is put in the state of being locked to the retainer 20. In addition, the checker 50 moves from the lock confirmation position in relative to the retainer 20 (i.e., the position shown in FIG. 33 through FIG. 35) to the release position (i.e., the position shown in FIG. 36 through FIG. 39) in the further push-in direction (i.e., in the direction further downward in FIG. 1 and FIG. 20), and thereby cancels the locking between the retainer and the annular boss 3a of the piped body 3.

That is, the quick connector 1 according to the present embodiment is a retainer/housing integrated type, and is also a checker-push type. In addition, the checker 50 in that quick connector 1 is a push-release type, because it is furnished with the release function. Hereinafter, detailed constructions of the retainer 20 and checker 50 will be explained. Thereafter, their movements or actions in the respective steps during the insertion of the piped body 3 into the quick connector 1, its release therefrom and its reinsertion thereinto will be explained. Unless otherwise specified especially, a side on which the checker 50 is mounted to the retainer 20 is labeled the "upper side" in the following explanations. That is, in the lock confirmation and push release by the checker 50, explanations will be made that the checker 50 shall be moved from the upper side to the lower side in relative to the retainer 20. Moreover, one of the sides of the quick connector 1 through which the piped body 3 is inserted is referred to as a "pipe-insertion side" (i.e., the right side in FIG. 1), and the opposite side is referred to as a "counter pipe-insertion side" (i.e., the left side in FIG. 1).

(2) Detailed Constructions of Retainer

Detailed constructions of the retainer 20 will be hereinafter explained with reference to FIG. 4 through FIG. 12. The retainer 20 is constructed to comprise a retainer body 30, and a retainer diametrically-enlarging claw 40. In the state where the retainer 20 is coupled together with the housing 10, the retainer body 30 is an undeformable part in the sense of distinguishing it from the retainer diametrically-enlarging claw 40.

This retainer body 30 comprises a tubular portion 31, an opening-end seat member 32, a lower-part coupler member 33, an upper-part coupler member 34, a first locker portion 35, and a pair of stoppers (36, 36). The tubular portion 31 is fitted into the pipe-insertion portion 12 of the housing 10. Moreover, the collar 70, and the annular sealing members (81, 82) are positioned in a middle axially between the stepped portion in the housing 10 and the end face of the tubular portion 31.

Figure 4:
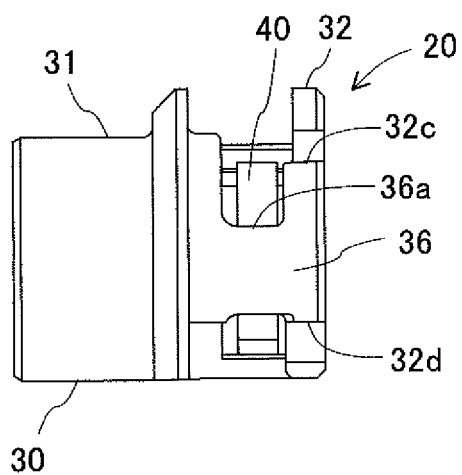
FIG. 4 is a front-view diagram of a retainer (i.e., a diagram viewed from the axially right-angle direction)
Figure 5:
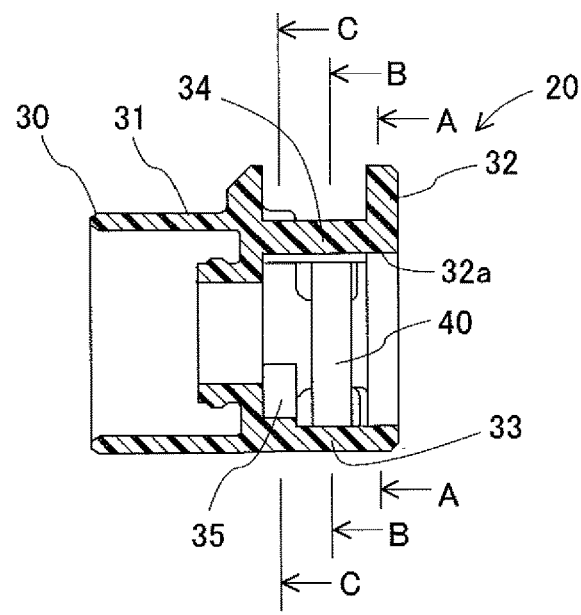
FIG. 5 is an axial cross-sectional diagram of the retainer.
Figure 9:
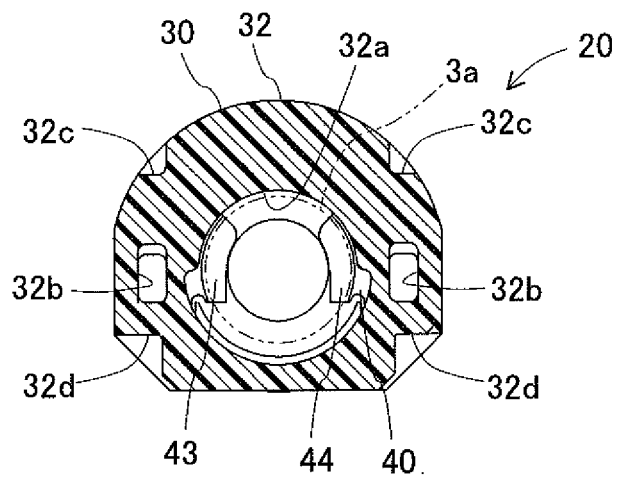
FIG. 9 is a cross-sectional diagram taken along the "A"-"A" line in FIG. 5.

As illustrated in FIG. 4 through FIG. 6 and FIG. 9, the opening-end seat member 32 is disposed coaxially so as to face to the tubular portion 31 while separated off at a distance from the tubular portion 31 in the axial direction. In addition, as illustrated in FIG. 5 and FIG. 9, a central bore 32a with a size, which enables the annular boss 3a of the piped body 3 to pass therethrough, is formed in the opening-end seat member 32. The central bore 32a is equivalent to the opening in the retainer 20.

Figure 6:
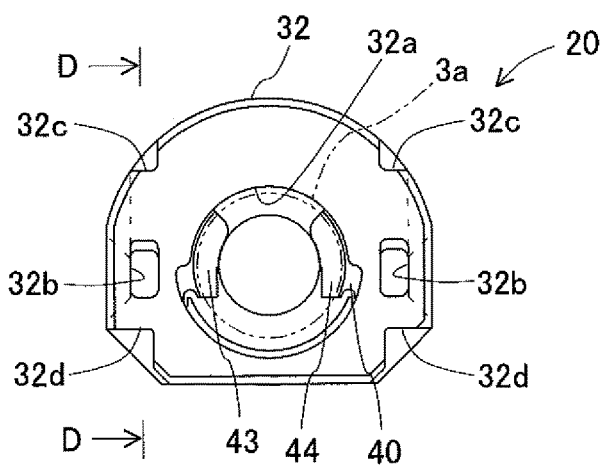
FIG. 6 is a diagram of the right-side view in FIG. 4.
Figure 7:
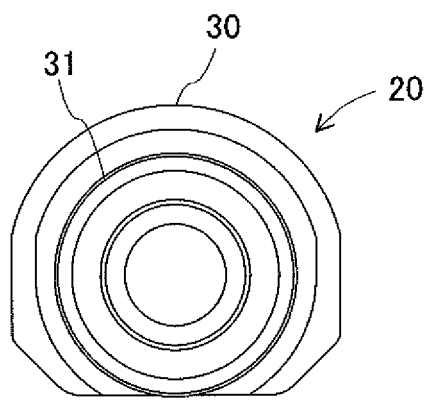
FIG. 7 is a diagram of the left-side view in FIG. 4.
Figure 12:
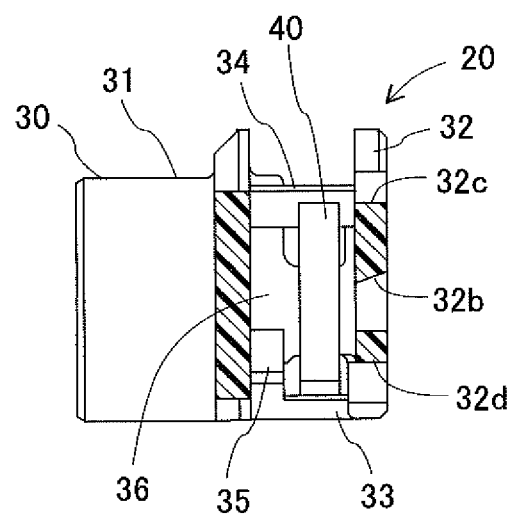
FIG. 12 is a cross-sectional diagram taken along the "D"-"D" line in FIG. 6.

In addition, as illustrated in FIG. 6 and FIG. 9, a pair of locking holes serving as a pair of second locker portions (32b, 32b) are formed on both the right and left sides of the central bore 32a in FIG. 9 when the opening-end seat member 32 is viewed from the axial direction. As illustrated in FIG. 12, the paired second locker portions (32b, 32b) are formed to penetrate in the axial direction. More specifically, the top face of the paired second locker portions (32b, 32b) is formed to incline from the counter pipe-insertion side in FIG. 12 toward the pipe-insertion side so as to go to the upper side. Although this will be explained later with reference to FIG. 20, it is intended to make the leading-end bosses (52a, 52b) of the checker axial-deforming claws (52, 52) in the checker 50 hook up onto the top faces in the initial state.

Moreover, as illustrated in FIG. 6 and FIG. 9, a pair of upper cut-offs (32c, 32c), which respectively form a flat-face seat, are formed in the upside of each of the paired second locker portions (32b, 32b) in some of the outer peripheral face of the opening-end seat member 32. The paired upper cut-offs (32c, 32c) are for carrying out the initial positioning of the checker axially-deforming claws (52, 52) in order to establish the initial state shown in FIG. 21. That is, the paired upper cut-offs (32c, 32c) are cut-offs for making the checker 50 likely to be mounted onto the retainer 20.

Moreover, as illustrated in FIG. 6 and FIG. 9, a pair of lower cut-offs (32d, 32d), which respectively form a flat-face seat, are formed in the lower side of each of the paired second locker portions (32b, 32b) in some of the outer peripheral face of the opening-end seat member 32. The paired lower cut-offs (32d, 32d) are for carrying the positioning of the checker axially-deforming claws (52, 52) in the lock confirmation state shown in FIG. 34. Their details will be described later.

Figure 10:
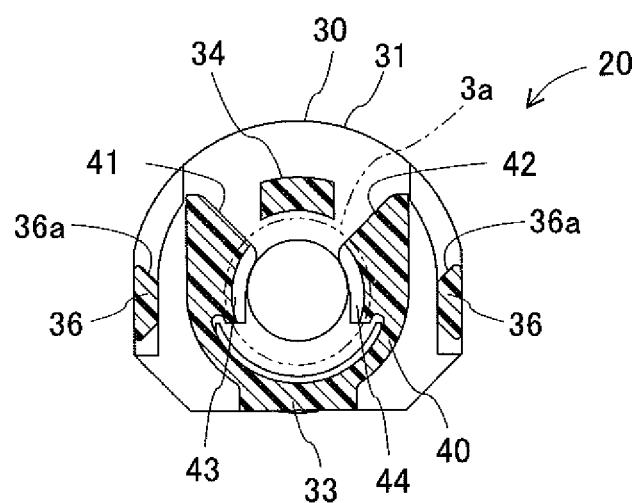
FIG. 10 is a cross-sectional diagram taken along the "B"-"B" line in FIG. 5.
Figure 11:
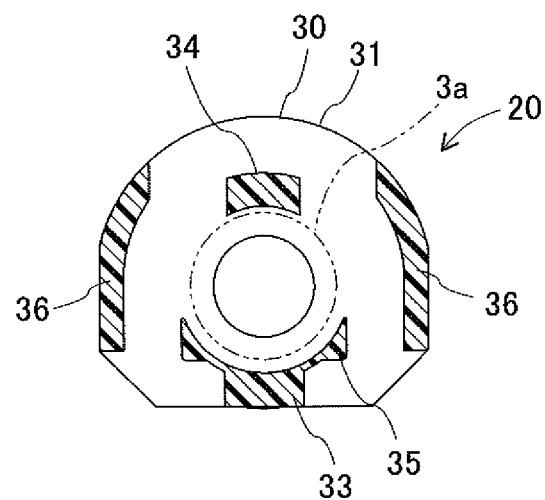
FIG. 11 is a cross-sectional diagram taken along the "C"-"C" line in FIG. 5.

As illustrated in FIG. 5, FIG. 10 and FIG. 11, the lower-part coupler member 33 is a part that couples the lower part of the tubular portion 31 together with the lower part of the opening-end seat member 32 in the axial direction. As illustrated in FIG. 5, FIG. 8, FIG. 10 and FIG. 11, the upper-part coupler member 34 couples the upper part of the tubular portion 31 together with the upper part of the opening-end seat member 32. This upper-part coupler member 34 is disposed at a position where it does not interfere with the annular boss 3a of the piped body 3 shown with the chain double-dashed line in FIG. 11.

As illustrated in FIG. 11, the first locker portion 35 is formed as a semi-arced configuration (or a letter-"C" configuration) opening toward the upside. This first locker portion 35 is disposed on the side of the tubular portion 31, as illustrated in FIG. 5, in some of the upper side face of the lower-part coupler member 33, as shown in FIG. 11. Moreover, the first locker portion 35 is disposed at a position where it does not interfere with the annular boss 3a of the piped body 3 shown with the chain double-dashed line in FIG. 11. Both the opposite ends of this first locker portion 35 are formed as an acute-angled shape, but the right and left side faces of the first locker portion 35 in FIG. 11 are formed as a vertically-plane-faced shape (or in a shape of parallel faces in the up/down direction).

As illustrated in FIG. 4, FIG. 10 and FIG. 11, the paired stoppers (36, 36) couple both the side faces of the tubular portion 31 together with both the side faces of the opening-end seat member 32, respectively. The paired stoppers (36, 36) are disposed at positions where they do not interfere with the annular boss 3a of the piped body 3 shown with the chain double-dashed line in FIG. 11. In addition, as illustrated in FIG. 4, cut-offs (36a, 36a) are formed on the upper side in some of the axial central parts of the paired stoppers (36, 36). In the piped-body insertion intermediate state shown in FIG. 25, along with permitting the diametric enlargement of the retainer diametrically-enlarging claw 40, the cut-offs (36, 36) have a function of inhibiting the diametrically-enlarging claw 40 from enlarging diametrically in such a case as the diametric-enlargement magnitude arrives at a setup magnitude. Their details will be described later.

As illustrated in FIG. 10, the retainer diametrically-enlarging claw 40 is formed as a letter-"C" configuration opening toward the upper side. This retainer diametrically-enlarging claw 40 is able to enlarge diametrically by elastic deformation. This retainer diametrically-enlarging claw 40 is disposed at the central part virtually in the axial direction, as illustrated in FIG. 5, in some of the upper side face of the lower-part coupler member 33, as shown in FIG. 10. That is, the retainer diametrically-enlarging claw 40 is disposed in a middle axially between the opening-end seat member 32 and the first lock portion 35.

Moreover, as illustrated in FIG. 10, the retainer diametrically-enlarging claw 40 is disposed at a position where it interferes with the annular boss 3a of the piped body 3 shown with the chain double-dashed line in FIG. 10 in such a state as it is not enlarged diametrically. However, the retainer diametrically-enlarging claw 40 enlarges diametrically, thereby enabling the annular boss 3a of the piped portion 3 to pass therethrough. That is, the retainer diametrically-enlarging claw 40 restores configurationally after the annular boss 3a of the piped body 3 has passed through the axial position of the retainer diametrically-enlarging claw 40, and thereby the retainer diametrically-enlarging claw 40 demonstrates to the annular boss 3a of the piped body 3 the function of locking it in the axial direction.

Figure 8:
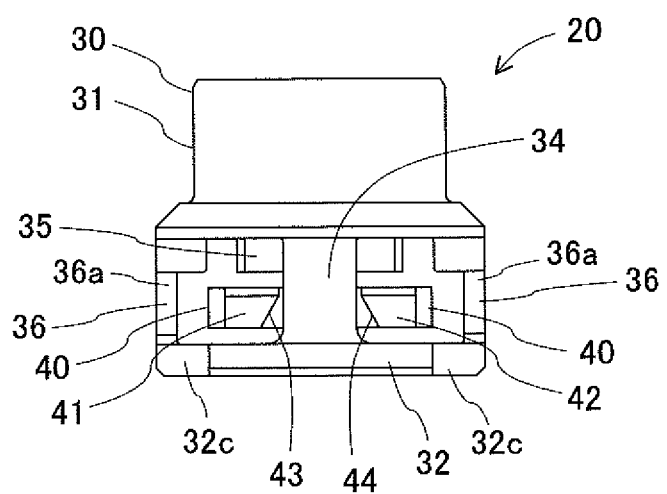
FIG. 8 is a diagram viewed from the above in FIG. 4 (i.e., a plan-view diagram)

In addition, as illustrated in FIG. 10, leading-end faces (41, 42) of the retainer diametrically-enlarging claw 40 are formed as a configuration inclining toward the opposite-face sides (or the inner side). The feature is intended to make the retainer diametrically-enlarging claw 40 enlarge diametrically in such a case as the leading-end faces (41, 42) are pressed by the releaser portions (55, 55) of the checker 50. Moreover, some of the leading-end sides in the retainer diametrically-enlarging claw 40, end faces (43, 44) are formed in an inclined manner so as to exhibit a narrowing width toward the opposite-face sides on the pipe-insertion side, as shown in FIG. 8. As described above, the retainer diametrically-enlarging claw 40 interferes with the annular boss 3a of the piped body 3 in such a state as it is not enlarged diametrically. Consequently, in order for the annular boss 3a of the piped body 3 to pass through the retainer diametrically-enlarging claw 40, the annular boss 3a of the piped body 3 needs to enlarge the retainer diametrically-enlarging claw 40 diametrically. Hence, forming the end faces (43, 44) in the inclined manner results in making it possible for the retainer diametrically-enlarging claw 40 to enlarge diametrically with ease when the annular boss 3a of the piped body 3 tries to pass through the retainer diametrically-enlarging claw 40.

(3) Detailed Constructions of Checker

Next, detailed constructions of the checker 50 will be hereinafter explained with reference to FIG. 13 through FIG. 19. As explained in the above-described "Outline of Quick Connector" section, the checker 50 is a member for confirming whether the annular boss 3a of the piped body 3 is put in a state where it has been locked to the retainer 20. The checker 50 is constructed to comprise a checker diametrically-enlarging claw 51, checker axially-deforming claws 52, clearance-intervention members 53, reinsertion-inhibiting bosses 54, and a releaser portions 55.

Figure 15:
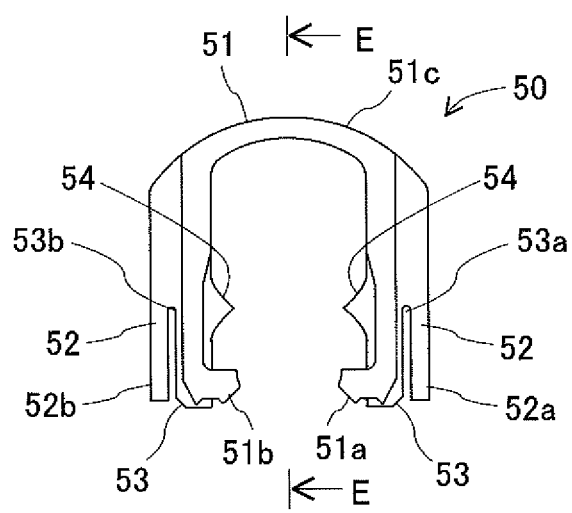
FIG. 15 is a diagram of the left-side view in FIG. 13.
Figure 16:
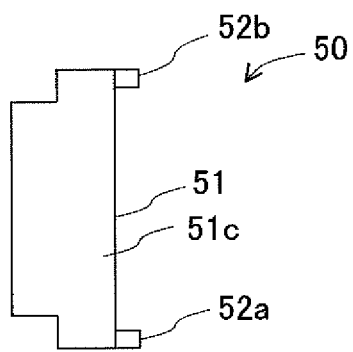
FIG. 16 is a diagram viewed from the above in FIG. 13 (i.e., a plan-view diagram)
Figure 17:
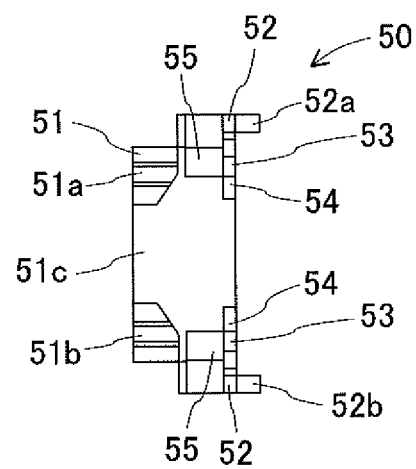
FIG. 17 is a diagram viewed from the below in FIG. 13 (i.e., a bottom-view diagram)

As illustrated in FIG. 15, the checker diametrically-enlarging claw 51 is formed as a letter-"C" configuration (involving letter-"U" configurations) being able to enlarge diametrically by elastic deformation. At both of the leading ends of the checker diametrically-enlarging claw 51, bosses (51a, 51b), which protrude toward the opposite-face sides (or the inner side), are formed.

Figure 13:
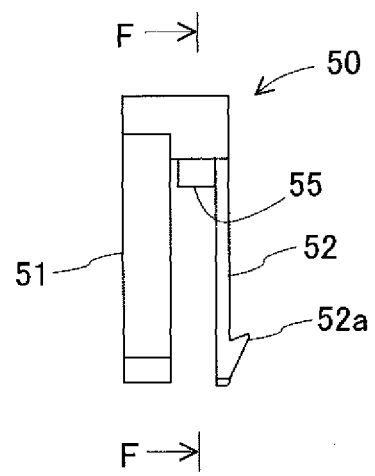
FIG. 13 is a front-view diagram of a checker (i.e., a diagram viewed from the axially right-angle direction)

The paired checker axially-deforming claws (52, 52) are disposed to separate off at a distance away from the checker diametrically-enlarging claw 51 in the right/left direction in FIG. 13 (equivalent to the axial direction in FIG. 1). The paired checker axially-deforming claws (52, 52) are disposed to extend in the same direction as the direction in which the checker diametrically-enlarging claw 51 extend on the leading-end side (i.e., to the lower side in FIG. 13). Moreover, the paired checker axially-deforming claws (52, 52) are formed to be able to undergo flexure or deflection deformation in the right/left direction in FIG. 13 (equivalent to the axial direction in FIG. 1) on the leading-end side, respectively. That is, the checker axially-deforming claws (52, 52) undergo flexure or deflection deformation toward the side of the checker diametrically-enlarging claw 51. At the leading ends of the checker axially-deforming claws (52, 52), bosses (52a, 52b), which protrude from the end face on the counter side (i.e., on the right side in FIG. 13) against the checker diametrically-enlarging claw 51, are formed, respectively.

Figure 14:
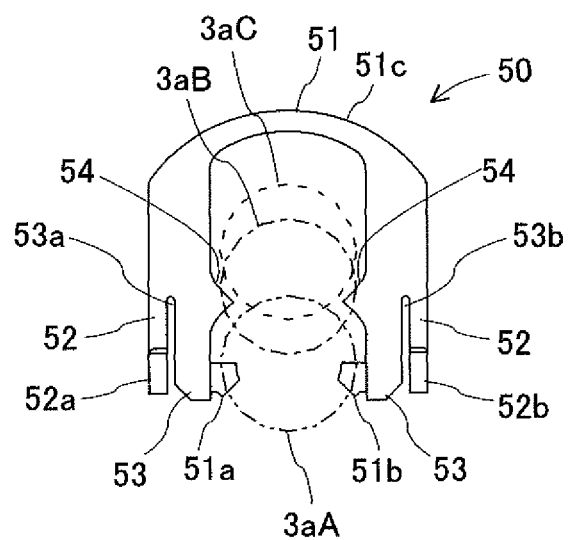
FIG. 14 is a diagram of the right-side view in FIG. 13, wherein: the chain double-dashed line "3aA" shows a relative position of the annular boss of a piped body in relative to the checker in such a case as the checker is placed at the initial position; the chain line "3aB" shows another relative position of the annular boss of the piped body in relative to the checker in such another case as the checker is placed at the lock confirmation position; and the broken line "3aC" shows a still another relative position of the annular boss of the piped body in relative to the checker in such a still another case as the checker is placed at the release position.

As illustrated in FIG. 14, the paired clearance-intervention members (53, 53) are disposed so as to extend in the same direction as the direction in which the checker axially-deforming claws (52, 52) extend. In addition, the paired clearance-intervention members (53, 53) are formed on a diametrically inner side of each of the checker axially-deforming claws (52, 52) by way of slits (53a, 53b). That is, even when the checker axially-deforming claws (52, 52) have deformed in the axial direction, the clearance-intervention members (53, 53) carries out movements or act ions independently of the checker axially-deforming claws (52, 52).

As illustrated in FIG. 14, the reinsertion-inhibiting bosses (54, 54) are disposed so as to protrude from the opposite-face sides of the paired clearance-intervention members (53, 53) toward the opposing sides (or the inner side), respectively. The reinsertion-inhibiting bosses (54, 54) are formed at around the middle in the elongation direction of the paired clearance-intervention members (53, 53), respectively. That is, the reinsertion-inhibiting bosses (54, 54) are not formed at all on some of the leading-end and base-end sides of the paired clearance-intervention members (53, 53).

Although the following will be described later in detail, the reinsertion-inhibiting bosses (54, 54) do not interfere with the annular boss 3a of the piped body 3 (being designated "3aA" in FIG. 14), as shown with the chain double-dashed line in FIG. 14, in such a case as the checker 50 is placed at the initial position. Moreover, the reinsertion-inhibiting bosses (54, 54) do not interfere with the annular boss 3a of the piped body 3 (being designated "3aC" in FIG. 14), either, as shown with the broken line in FIG. 14, also in such a case as the checker 50 is placed at the release position. However, the reinsertion-inhibiting bosses (54, 54) do interfere with the annular boss 3a of the piped body 3 (being designated "3aB" in FIG. 14), as shown with the chain line in FIG. 14, only in such a case as the checker 50 is placed at the lock confirmation position.

Figure 18:
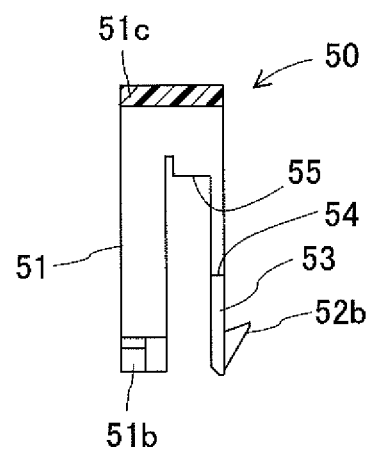
FIG. 18 is a cross-sectional diagram taken along the "E"-"E" line in FIG. 15.
Figure 19:
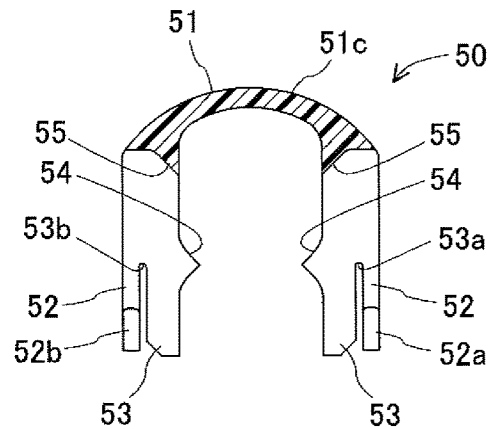
FIG. 19 is a cross-sectional diagram taken along the "F"-"F" line in FIG. 13.

As illustrated in FIG. 13 and FIG. 18, the releaser portions (55, 55) are formed in a middle axially between the checker diametrically-enlarging claw 51 and the checker axially-deforming claws 52, and on the side of the base 51c in the checker diametrically-enlarging claw 51. As illustrated in FIG. 19, the releaser portions (55, 55) are formed in an inclined manner from the inner side toward the outer side, respectively. The releaser portions (55, 55) are formed as a configuration conforming to the inclination of the leading-end faces (41, 42) of the retainer diametrically-enlarging claw 40, respectively. Although the following will be explained in detail later, the releaser portions (55, 55) enlarge the retainer diametrically-enlarging claw 40 diametrically by the checker 50 that is moved from the lock confirmation position (i.e., the position shown in FIG. 32 through FIG. 34) to the lower release position (i.e., the position shown in FIG. 35 through FIG. 37), in relative to the retainer 20.

(4) Explanations on Movements or Actions

Next, explanations will be made on movements or actions of the respective component parts in the quick connector 1 when the piped body 3 is inserted into the quick connector 1. Thereafter, explanations will be made on movements or actions of the respective component parts of the quick connector 1 when the piped body 3 is pulled from out of the quick connector 1. In addition, explanations will be made on movements or actions of the respective component parts of the quick connector 1 when the piped body 3 is reinserted into the quick connector 1.

(5) State before Piped-Body Insertion

Figure 20:
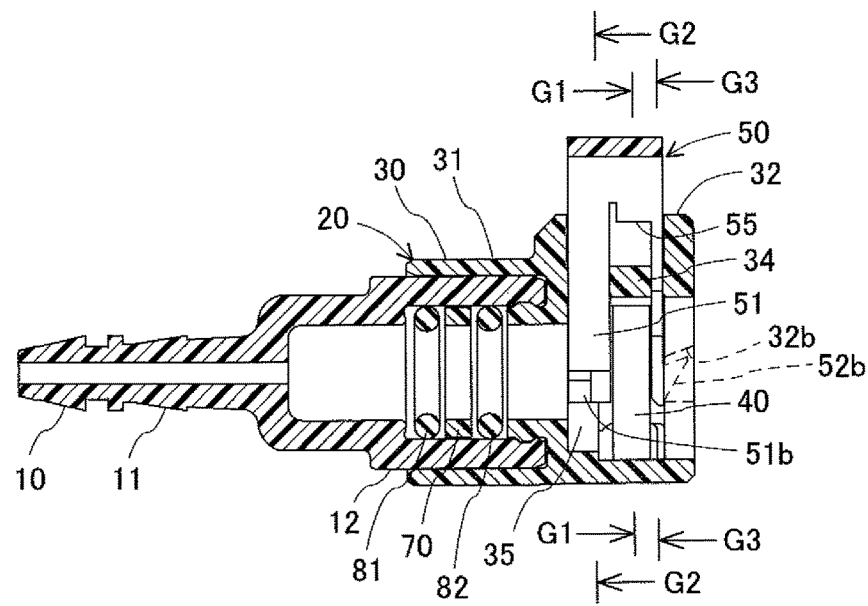
FIG. 20 illustrates a state before inserting the piped body into the quick connector (i.e., a state before the piped-body insertion), and is an axial cross-sectional diagram of the quick connector in such a state as the checker is placed at the initial position.

First of all, explanations will be made on a state before the piped body 3 is inserted into the quick connector 1 with reference to FIG. 20 through FIG. 23. As illustrated in FIG. 20 through FIG. 23, "state before piped-body insertion" is a state where the checker 50 is placed at the initial position in relative to the retainer 20. In detail, the checker 50 is mounted onto the retainer 20 from above, as shown in FIG. 20. The phrase, "onto the retainer 20 from above," referred to herein is equivalent to "onto the opening side of the retainer diametrically-enlarging claw 40."

Figure 22:
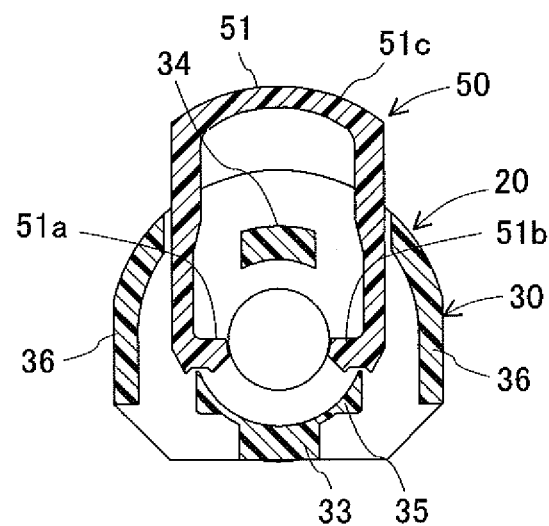
FIG. 22 is a cross-sectional diagram taken along the "G2"-"G2" line in FIG. 20, and illustrates such a state as a checker diametrically-enlarging elastic-deformation claw is not enlarged diametrically (i.e., the state before the piped-body insertion)

More specifically, the leading-end sides of the checker diametrically-enlarging claw 51 are inserted into the axial clearance between the tubular portion 31 and the retainer diametrically-enlarging claw 40. On this occasion, as illustrated in FIG. 22, the leading ends of the first locker portions 35 in the retainer body 30 are placed further ahead of the ends of the leading-end bosses (51a, 51b) in the checker diametrically-enlarging claw 51 (namely, further down below in FIG. 22). Consequently, the checker diametrically-enlarging claw 51 is locked to the first locker portions 35 in such a state as it is not enlarged diametrically, and is thereby inhibited from moving down below from the initial position in relative to the retainer body 30.

Figure 21:
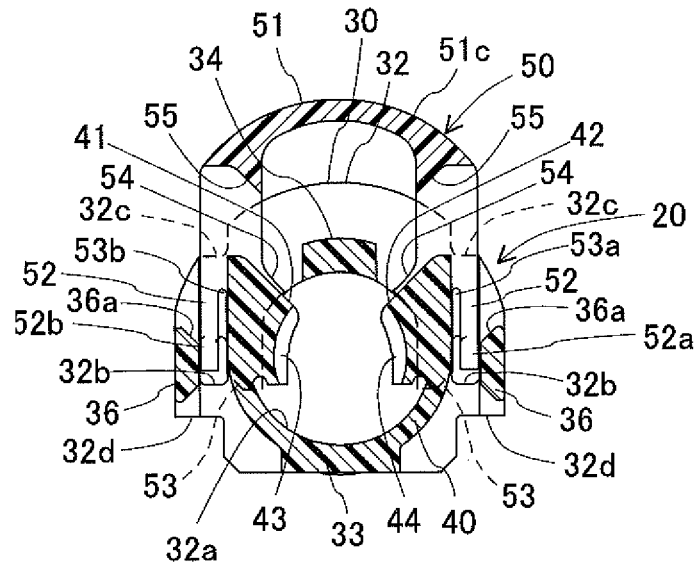
FIG. 21 is a cross-sectional diagram taken along the "G1"-"G1" line in FIG. 20, and illustrates such a state as a retainer diametrically-enlarging elastic-deformation claw is not enlarged diametrically (i.e., the state before the piped-body insertion)

In addition, as illustrated in FIG. 20 and FIG. 21, the paired clearance-intervention members (53, 53) are inserted into the axial clearance between the retainer diametrically-enlarging claw 40 and the opening-end seat member 32 of the retainer body 30, in the initial state. On this occasion, as illustrated with the broken line in FIG. 20, the leading-end bosses (52a, 52b) of the checker axially-deforming claws (52, 52) come to be put in such a state as they go into the second locker portions (32b, 32b) of the opening-end seat member 32 in the retainer body 30. Therefore, the leading-end bosses (52a, 52b) of the checker axially-deforming claws (52, 52) come to be put in the state of being locked to the second locker portions (32b, 32b), and thereby it is possible to prevent the checker 50 from being pulled upward from out of the retainer 20. In particular, since they are locked at an acute angle to each other, they work more effectively.

Figure 23:
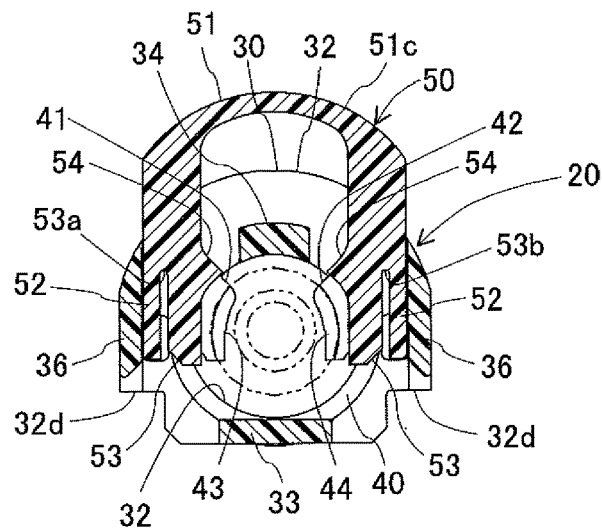
FIG. 23 is a cross-sectional diagram taken along the "G3"-"G3" line in FIG. 20, and shows the annular boss of the piped body with the chain double-dashed line (i.e., the state before the piped-body insertion)

Moreover, in such a state as the checker 50 is placed at the initial position, the paired reinsertion-inhibiting bosses (54, 54) are placed at such a position as they do not interfere with the annular boss 3a of the piped body 3, as shown in FIG. 23.

(6) Piped-Body Insertion Intermediate State

Figure 24:
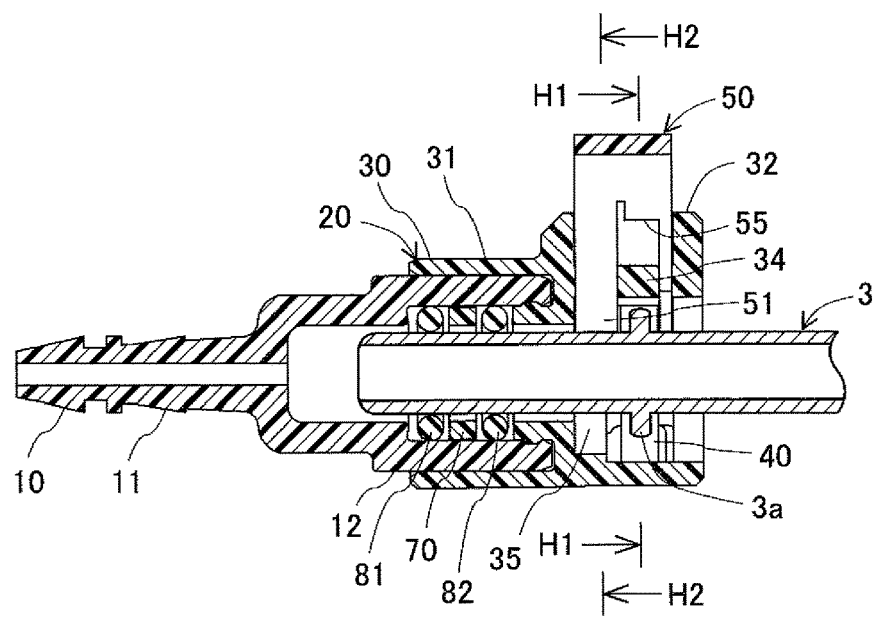
FIG. 24 is an axial cross-sectional diagram of the quick connector in such as state as part of the piped body is inserted into the quick connector, wherein the checker is placed at the initial position (i.e., an intermediate state during the piped-body insertion)

Next, explanations will be made on such a state as the leading end of the piped body 3 is partially inserted into the quick connector 1 from the side of the opening-end seat member 32 (i.e., the piped-body insertion intermediate state) with reference to FIG. 24 through FIG. 26. As the piped body 3 is being inserted into the quick connector 1 from the side of the opening-end seat member 32, the annular boss 3a passes through the central bore 32a in the opening-end seat member 32 of the retainer body 30, as shown in FIG. 24. Subsequently, the annular boss 3a passes through the reinsertion-inhibiting bosses (54, 54) of the checker 50, because the reinsertion-inhibiting bosses (54, 54) do not interfere with the annular boss 3a, as shown in FIG. 25.

Subsequently, the annular boss 3a interferes with the retainer diametrically-enlarging claw 40. Consequently, the annular boss 3a of the piped body 3 deforms the retainer diametrically-enlarging claw 40 elastically so as to enlarge it diametrically, as shown in FIG. 25. In particular, since the annular boss 3a of the piped body 3 presses the pipe-insertion-side end faces (43, 44) in some of the leading-end sides of the retainer diametrically-enlarging claw 40, the retainer diametrically-enlarging claw 40 enlarges diametrically with ease relatively.

Note herein that the checker diametrically-enlarging claw 51 is placed on the counter pipe-insertion side of the retainer diametrically-enlarging claw 40. Therefore, although the retainer diametrically-enlarging claw 40 is pressed in the axial direction by the annular boss 3a of the piped body 3, the retainer diametrically enlarging claw 40 is suppressed from deforming toward the counter pipe-insertion side by the checker diametrically-enlarging claw 51. Because of this, the retainer diametrically-enlarging claw 40 as well comes to enlarge diametrically with ease relatively.

Figure 25:
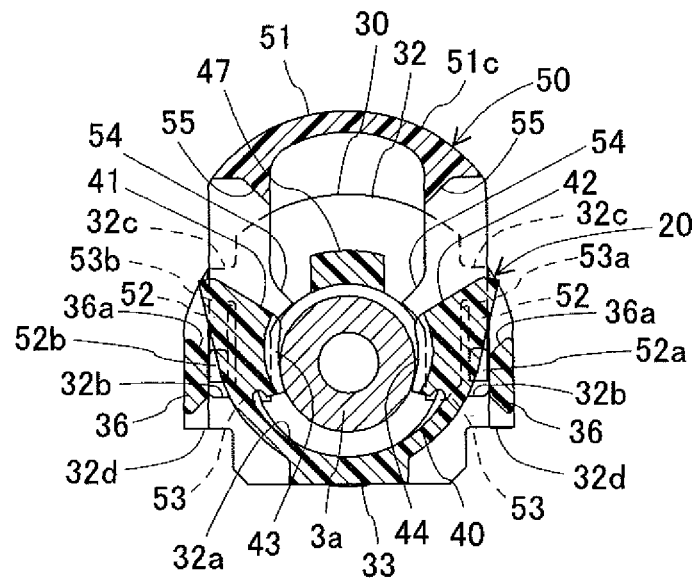
FIG. 25 is a cross-sectional diagram taken along the "H1"-"H1" line in FIG. 24, and illustrates such a state as the retainer diametrically-enlarging elastic-deformation claw is enlarged diametrically (i.e., the intermediate state during the piped-body insertion)

As illustrated in FIG. 25, the retainer diametrically-enlarging claw 40 enlarges diametrically, and thereby the annular boss 3a of the piped body 3 can pass through the position of the retainer diametrically-enlarging claw 40. Note herein that the stoppers (36, 36) are formed on the retainer body 30. When the retainer diametrically-enlarging claw 40 enlarges diametrically, the stoppers (36, 36) inhibit the retainer diametrically-enlarging claw 40 from diametrically enlarging to exhibit the diametrically enlargement magnitude that becomes more than the setup magnitude. Therefore, upon coming in contact with the stoppers (36, 36), the retainer diametrically-enlarging claw 40 does not enlarge diametrically any more.

Figure 26:
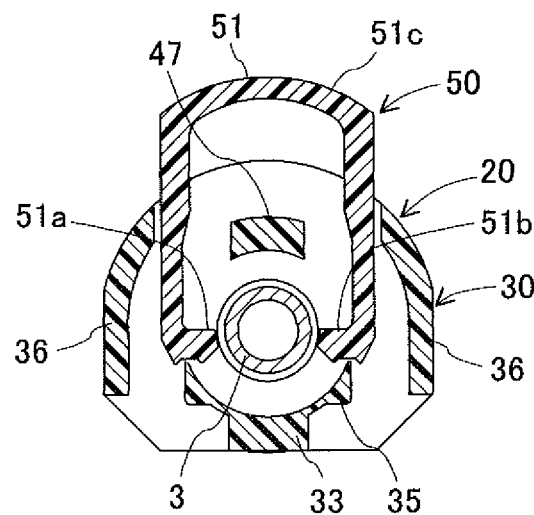
FIG. 26 is a cross-sectional diagram taken along the "H2"-"H2" line in FIG. 24, and illustrates such a state as the checker diametrically-enlarging elastic-deformation claw is not enlarged diametrically (i.e., the intermediate state during the piped-body insertion)

While the retainer diametrically-enlarging claw 40 carries out the aforementioned movements or actions, the checker diametrically-enlarging claw 51 does not at all enlarge diametrically, as shown in FIG. 26. That is, the leading-end bosses (51a, 51b) of the checker diametrically-enlarging claw 51 are inhibited from moving downward by the first locker portions (35, 35) of the retainer body 30.

On this occasion, the paired checker axially-deforming claws (52, 52) come to be put in such a state as they are held or interposed between the diametrically-enlarged retainer diametrically-enlarging claw 40 and the opening-end seat member 32, as shown in FIG. 25. That is, the checker axially-deforming claws (52, 52) come to be put in such a state as they are inhibited from undergoing flexure or deflection deformation in the axial direction.

Note herein that the checker axially-deforming claws (52, 52) should undergo flexure or deflection deformation in order that the checker axially-deforming claws (52, 52) detach from the second locker portions (32b, 32b) of the retainer body 30. As described above, however, the checker axially-deforming claws (52, 52) come to be put in the state of being inhibited from undergoing flexure or deflection deformation, under such a condition as the retainer diametrically-enlarging claw 40 is enlarged diametrically. Consequently, the checker axially-deforming claws (52, 52) maintain the state of being locked to the second locker portions 32b of the retainer body 30. Moreover, the checker axially-deforming claws (52, 52) are locked to the second locker portions 32b, and thereby the checker axially-deforming claws (52, 52) are inhibited from moving from the initial position downward in relative to the retainer 20.

(7) Piped-Body Insertion Completed State

Figure 27:
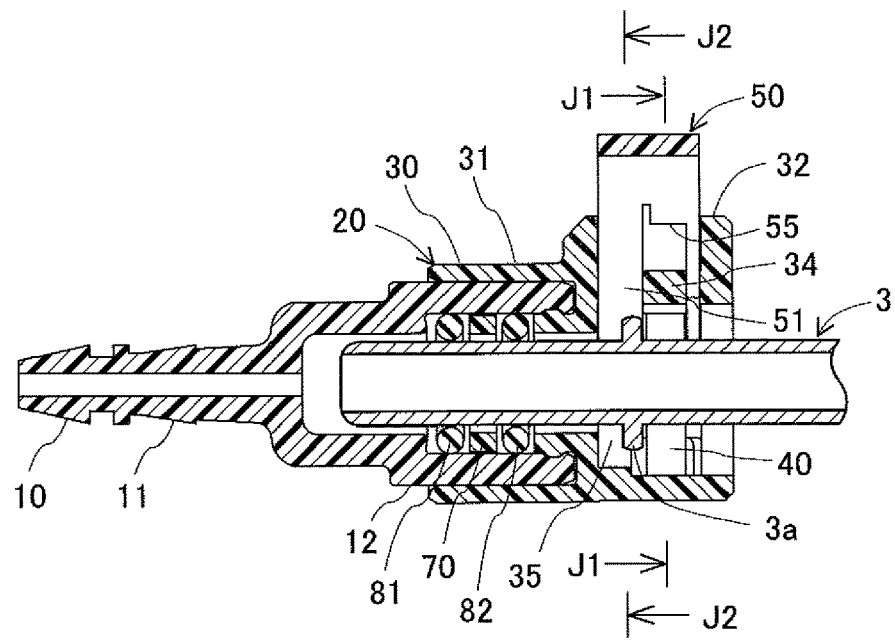
FIG. 27 is an axial cross-sectional diagram of the quick connector in such as state as the piped body is inserted into the quick connector toward the inside furthermore beyond the state shown in FIG. 24, wherein the checker is placed at the initial position (i.e., a completed state of the piped-body insertion)

Next, explanations will be made on such a state as the leading end of the piped body 3 is partially inserted more into the quick connector 1 toward the inner side (i.e., the piped-body insertion completed state) with reference to FIG. 27 through FIG. 29. As illustrated in FIG. 27, the annular boss 3a of the piped body 3 passes through the position of the retainer diametrically-enlarging claw 40. Then, as illustrated in FIG. 28, the retainer diametrically-enlarging claw 40 restores the configuration, and thereby the retainer diametrically-enlarging claw 40 comes to lock to the annular boss 3a of the piped body 3 in the axial direction.

On this occasion, the annular boss 3a of the piped body 3 has moved to the position of the checker diametrically-enlarging claw 51, as shown in FIG. 27. Consequently, the checker diametrically-enlarging claw 51 is enlarged diametrically by the annular boss 3a of the piped body 3 that has finished passing through the retainer diametrically-enlarging claw 40, as shown in FIG. 29. Then, the leading-end bosses (51a, 51b) of the checker diametrically-enlarging claw 51 get away from the position of the first locker portions 35 of the retainer body 30. That is, the checker diametrically-enlarging claw 51 comes to be released from the locking to the first locker portions 35, thereby coming to be put in such a state as it is able to move from the initial position to the lock confirmation position down below.

Figure 28:
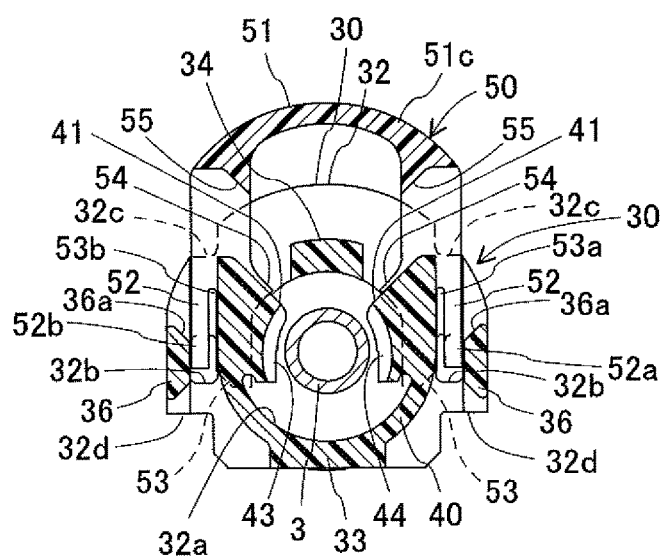
FIG. 28 is a cross-sectional diagram taken along the "J1"-"J1" line in FIG. 27, and illustrates such a state as the retainer diametrically-enlarging elastic-deformation claw is not enlarged diametrically (i.e., the completed state of the piped-body insertion)
Figure 29:
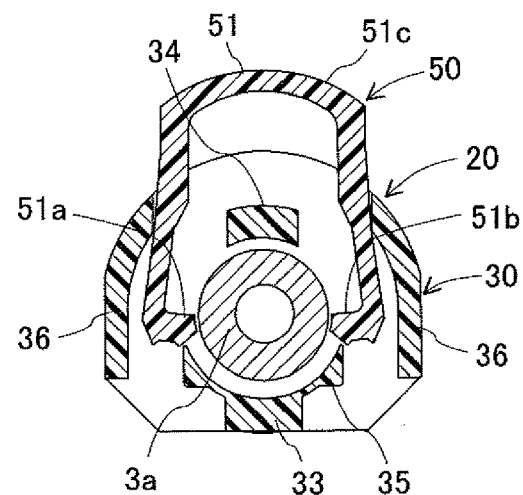
FIG. 29 is a cross-sectional diagram taken along the "J2"-"J2" line in FIG. 27, and illustrates such a state as the checker diametrically-enlarging elastic-deformation claw is enlarged diametrically (i.e., the completed state of the piped-body insertion)

Moreover, the retainer diametrically-enlarging claw 40 comes to be put in the state of restoring the configuration as described above, and thereby the checker axially-deforming claws (52, 52) come to be put in such a state as they are not held or interposed by the retainer diametrically-enlarging claw 40, as shown in FIG. 28. Consequently, the checker axially-deforming claws (52, 52) come to be put in such a state as they are able to undergo flexure or deflection deformation in the axial direction. That is, the checker axially-deforming claws (52, 52) come to be able to cancel the locking to the second locker portions 32b of the retainer body 30. Then, the checker axially-deforming claws (52, 52) come to be put in such a state as they are able to move from the initial position to the lock confirmation position down below in relative to the retainer body 30.

Thus, both of the checker diametrically-enlarging claw 51 and checker axially-deforming claws (52, 52) come to be put in the state of being able to move from the initial position to the lock confirmation position. That is, when the retainer diametrically-enlarging claw 40 eventually comes to be put in such a state as it locks the annular boss 3a of the piped body 3 securely, the checker 50 comes to be put in such a state as it is able to move downward in relative to the retainer 20 for the first time.

(8) Checker-Movement Intermediate State

Figure 30:
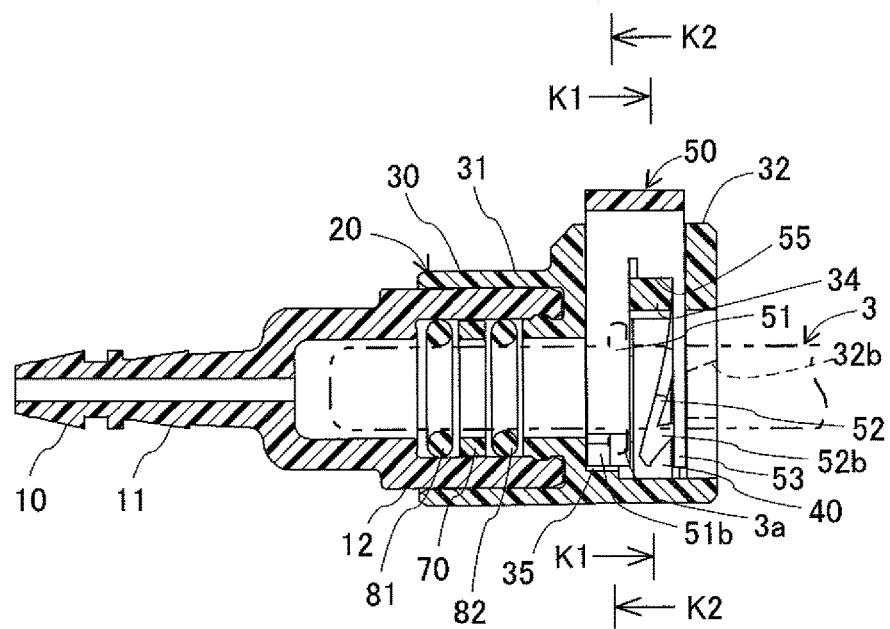
FIG. 30 is an axial cross-sectional diagram of the quick connector in such as state as the checker is operated to slide slightly in relative to the retainer from the state shown in FIG. 27 in the push-in direction (i.e., an intermediate state during the checker movement); namely, the drawing illustrates such a state as the checker is placed intermediately between the initial position and the lock confirmation position; and moreover illustrates the piped body with the chain double-dashed line showing the outer shape alone.
Figure 31:
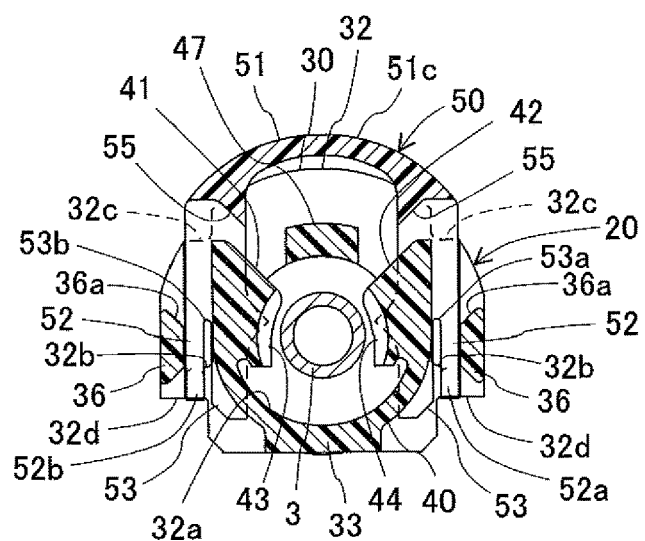
FIG. 31 is a cross-sectional diagram taken along the "K1"-"K1" line in FIG. 30, and illustrates such a state as the retainer diametrically-enlarging elastic-deformation claw is not enlarged diametrically (i.e., the intermediate state during the checker movement)
Figure 32:
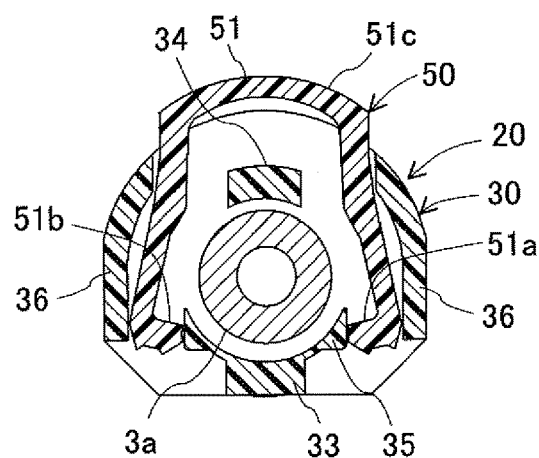
FIG. 32 is a cross-sectional diagram taken along the "K2"-"K2" line in FIG. 30, and illustrates such a state as the checker diametrically-enlarging elastic-deformation claw is enlarged diametrically (i.e., the intermediate state during the checker movement)

Next, an operator or worker moves the checker 50 from the initial position to the lock confirmation position after he or she has completed the insertion of the piped body 3. That is, the checker 50 is moved from the initial position to the lock confirmation position by means of a push-in operation to the checker 50 by the operator or worker. Hereinafter, explanations will be made on such a state as the checker 50 is placed intermediately between the initial position and the lock confirmation (i.e., the checker-movement intermediate state) with reference to FIG. 30 through FIG. 32. Note herein that, in FIG. 30, only the outer shape of the piped body 3 is shown with the chain double-dashed line in order to make the state of the checker axially-deforming claws (52, 52) easy to discern. As illustrated in FIG. 30 and FIG. 31, it is understood how the checker axially-deforming claws (52, 52) appear to undergo flexure or deflection de format ion on the leading-end side. Moreover, as illustrated in FIG. 32, the checker diametrically-enlarging claw 51 moves downward along the side faces of the first locker portions 35 in the retainer body 30.

(9) Lock-Confirmation Completed State

Next, explanations will be made on such a state as the checker 50 has arrived at the lock confirmation position (i.e., the lock-confirmation completed state) with reference to FIG. 33 through FIG. 35. As illustrated in FIG. 35, the checker diametrically-deforming claw 51 restores the configuration, thereby being locked to the leading-end-side lower face of the first locker portions in the retainer body 30. That is, the checker diametrically-enlarging claw 51 is locked to the first locker portions 35, and is thereby inhibited from moving in the direction of returning or getting back (i.e., upward).

In addition, as illustrated in FIG. 33 and FIG. 34, the checker axially-deforming claws (52, 52) are locked to the lower cut-offs (32d, 32d) of the opening-end seat member 32 in the retainer body 30. That is, the checker axially-deforming claws (52, 52) are locked to the opening-end seat member 32, and are thereby inhibited from moving in the direction of returning or getting back (i.e., upward).

Moreover, as illustrated in FIG. 34, since the leading-end faces (41, 42) of the retainer diametrically-enlarging claw 40 are placed under the releaser portions (55, 55) of the checker 50, the retainer diametrically-enlarging claw 40 should be enlarged diametrically in order that the checker 50 moves further downward. The checker 50 should be pushed in further in order to enlarge the retainer diametrically-enlarging claw 40 diametrically. That is, when the checker 50 arrives at the lock confirmation position, the checker 50 comes to be put in such a state as no force acts on the checker 50, and thereby comes to be put in the state of being locked upward and downward in relative to the retainer 20.

Thus, the checker 50 is pushed into the retainer 20 so that it comes to be put in the state of arriving at the lock confirmation position, and thereby the operator or worker can recognize that the piped body 3 is put in the state of being coupled together with the quick connector 1 securely. Note that, as explained in the above-described piped-body insertion completed state, the piped body 3 comes to be put in the state of being coupled together with the quick connector 1 securely at the time of the piped-body insertion completed state.

Incidentally, in order to pull the piped body 3 from out of the quick connector 1 after the piped body 3 has been coupled together with the quick connector 1, it is necessary to enlarge the retainer diametrically-enlarging claw 40 diametrically. When there is a space permitting the retainer diametrically-enlarging claw 40 to deform, the force for pulling out the piped body 3 becomes smaller relatively.

In the present embodiment, the clearance-intervention members (53, 53) have a function of burying or filling up the axial clearances between the retainer diametrically-enlarging claw 40 and the opening-end seat member 32 while the checker 50 moves from the initial position to the lock confirmation position. That is, the clearance-intervention members (53, 53) inhibit the retainer diametrically-enlarging claw 40 from deforming toward the axial direction. As a result, it is possible to make the force for pulling the piped body 3 from out of the retainer 20 larger in such a state as the annular boss 3a of the piped body 3 is locked to the retainer diametrically enlarging claw 40. Moreover, since the slits (53a, 53b) intervene between the clearance-intervention members (53, 53) and the checker axially-deforming claws (52, 52), the checker axially-deforming claws (52, 52) come to be put in the state of being able to deform elastically, regardless of whether or not the clearance-intervention members (53, 53) are inhibited from deforming elastically. Therefore, it is possible to materialize the above-described movements or actions of the checker axially-deforming claws (52, 52).

(10) Piped-Body Insertion Incomplete State

As described above, although the checker diametrically-enlarging claw 51 enlarges diametrically, the retainer diametrically-enlarging claw 40 does not at all enlarge diametrically, in the piped-body insertion completed state. On the other hand, although the retainer diametrically-enlarging claw 40 enlarges diametrically, the checker diametrically-enlarging claw 51 does not at all enlarge diametrically, in the piped-body insertion intermediate state.

Note herein that the checker diametrically-enlarging claw 51 is arranged adjacently to the retainer diametrically-enlarging claw 40 in the axial direction. Consequently, there might possibly arise such a fear that such a state occurs as the annular boss 3a of the piped body 3 enlarges both the retainer diametrically-enlarging claw 40 and the checker diametrically-enlarging claw 51 diametrically, in such a condition as the piped body 3 is not fully inserted into the inside. If so, the leading-end bosses (51a, 51b) of the checker diametrically-enlarging claw 51 separate from the position of the first locker portions 35 in the retainer body 30, as shown in FIG. 29. That is, the checker diametrically-enlarging claw 51 comes to be put in such a state as it is able to move or act slidingly downward, without being locked to the first locker portions 35.

However, because of the retainer diametrically-enlarging claw 40 that is enlarged diametrically, the checker axially-deforming claws (52, 52) are inhibited from flexing or deflecting on the leading-end side. That is, the checker axially-deforming claws (52, 52) are inhibited from moving downward. Therefore, the checker 50 cannot move downward to the lock confirmation position down below, in such a condition as the annular boss 3a of the piped body 3 enlarges the retainer diametrically-enlarging claw 40 diametrically. Thus, even if the annular boss 3a of the piped body 3 should have come to be put in such a state as it enlarges the retainer diametrically-enlarging claw 40 and checker diametrically-enlarging claw 51 diametrically, the lock confirmation by the checker 50 cannot be done. Therefore, the operator or worker can recognize that the insertion of the piped body 3 is in the incomplete state.

(11) Piped-Body Pullout State

Figure 37:
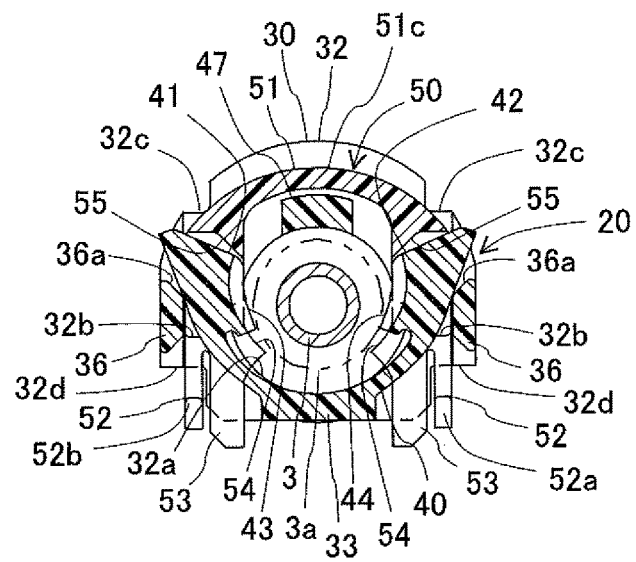
FIG. 37 is a cross-sectional diagram taken along the "M1"-"M1" line in FIG. 36, and illustrates such a state as the retainer diametrically-enlarging elastic-deformation claw is enlarged diametrically by a releaser member of the checker (i.e., the state as the piped body is pulled out)
Figure 38:
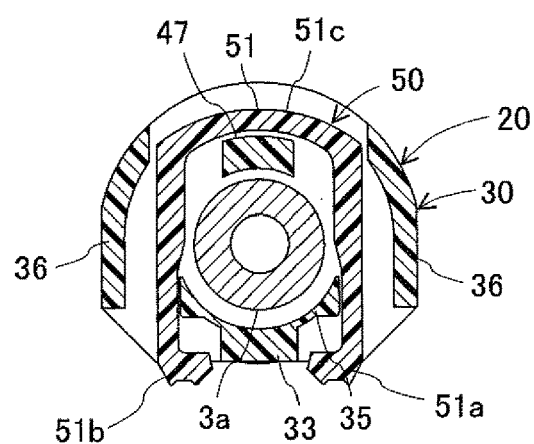
FIG. 38 is a cross-sectional diagram taken along the "M2"-"M2" line in FIG. 36, and illustrates such a state as the checker diametrically-enlarging elastic-deformation claw is not enlarged diametrically (i.e., the state as the piped body is pulled out)

Next, there arises such a case as the piped body 3 is pulled from out of the quick connector 1 during maintenance, and the like. This case will be hereinafter explained with reference to FIG. 36 through FIG. 39. As illustrated in FIG. 36 through FIG. 39, the operator or worker carries out an operation to the checker 50 to push it in from the lock confirmation position to further down below, thereby moving the checker 50 to the release position. On this occasion, the releaser portions (55, 55) of the checker 50 enlarge the retainer diametrically-enlarging claw 40 diametrically, as shown in FIG. 37. That is, the operator or worker needs such an extent of push-in force that makes it possible to enlarge the retainer diametrically-enlarging claw 40 diametrically, upon pulling out the piped body 3.

Figure 39:
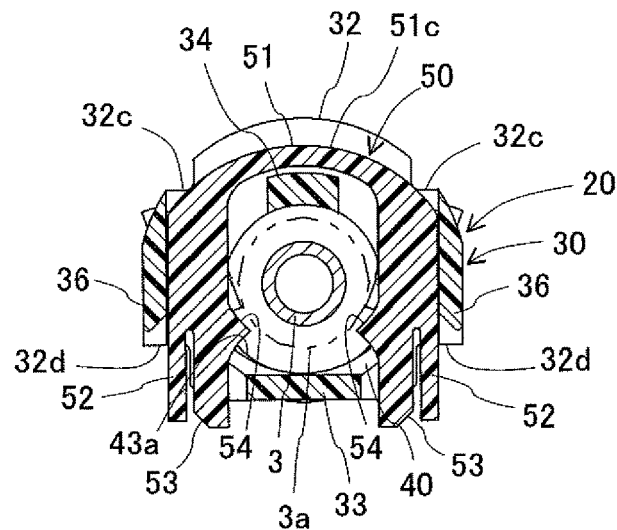
FIG. 39 is a cross-sectional diagram taken along the "M3"-"M3" line in FIG. 36 (i.e., the state as the piped body is pulled out)

The retainer diametrically-enlarging claw 40 enlarges diametrically, and thereby the axial locking between the retainer diametrically-enlarging claw 40 and the annular boss 3a of the piped body 3 is canceled. On this occasion, the reinsertion-inhibiting bosses (54, 54) of the checker 50 are placed at such a position as they do not interfere with the annular boss 3a of the piped body 3, as shown in FIG. 39. Therefore, the operator or worker can pull the piped body 3a from out of the quick connector 1. That is, the checker 50 can make him or her carry out the release movement or action of the retainer 20. Thus, the checker 50 functions as one which carries out confirming the locking of the piped body 3, and the releasing of the piped body 3.

(12) At the Time of Reinserting Piped Body

Such a case as the piped body 3 is reinserted into the quick connector 1 after the piped body 3 has been pulled from out of the quick connector 1 will be explained with reference to FIG. 40. When the operator or worker cancels the application of force onto the checker 50 after he or she has been pulled the piped body 3 from out of the quick connector 1, the checker 50 moves to the lock confirmation position. The reason for this is that the configuration restoring force of the retainer diametrically-enlarging claw 40 acts thereon.

Figure 40:
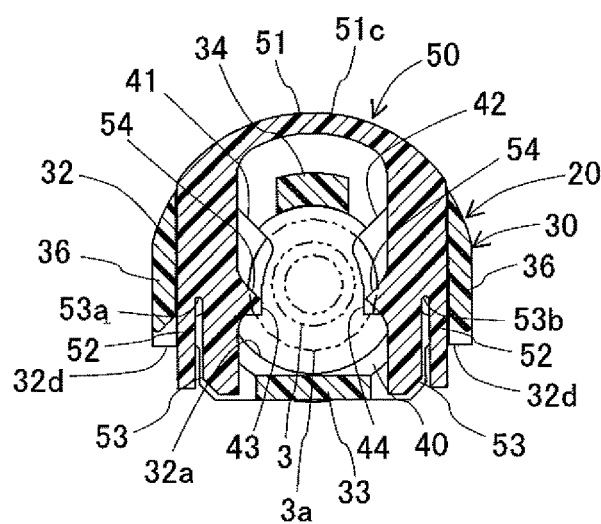
FIG. 40 is a diagram corresponding to the cross-sectional diagram taken along the "M3"-"M3" line in FIG. 36 in such a case as the piped body is reinserted after the piped body has been pulled from out of the quick connector (i.e., at the time of reinserting the piped body).

In such a state as the piped body 3 is pulled from out of the quick connector 1, and in such a state as the checker 50 is placed at the lock confirmation position, their positional relationships become as shown in FIG. 40. On this occasion, the reinsertion-inhibiting bosses (54, 54) of the checker 50 are placed at such a position as they interfere with the annular boss 3a of the piped body 3 (shown with the chain double-dashed line in FIG. 40).

In addition, the reinsertion-inhibiting bosses (54, 54) are arranged on the side of the opening-end seat member 32 beyond the retainer diametrically-enlarging claw 40. Therefore, when the piped body 3 is inserted through the central bore 32a of the opening-end seat member 32 in the retainer 20 again, the annular boss 3a of the piped body 3 hooks up onto the reinsertion-inhibiting bosses (54, 54) before it comes in contact with the retainer diametrically-enlarging claw 40. Consequently, the piped body 3 is inhibited from being inserted into the retainer 20 and housing 10.

Note herein that the reinsertion-inhibiting bosses (54, 54) are disposed so as to protrude from the opposite-face side of the paired clearance-intervention members (53, 53) toward their opposing side, respectively. In addition, the checker axially-deforming claws (52, 52) are formed on the counter side against the opposite face of the paired clearance-intervention members (53, 53) by way of the slits (53a, 53b), respectively. Thus, the reinsertion-inhibiting bosses (54, 54) are formed integrally with the clearance-intervention members 53 and the checker axially-deforming claws 52 at an identical position with each other in the axial direction, respectively.

Moreover, those paired integral members (52, 53, 54) are inhibited from enlarging their distance between the opposite faces by the stoppers 36 of the retainer body 30. Consequently, when the annular boss 3a of the piped body 3 are pressed against the re insert ion-inhibiting bosses (54, 54), the distance between the opposite faces of the paired reinsertion-inhibiting bosses (54, 54) does not enlarge at all. Therefore, the reinsertion-inhibiting bosses (54, 54) maintain the state of being hooked up onto the annular boss 3a of the piped body 3, so that they securely inhibit the piped body 3 from being reinserted.

Therefore, it is possible to prompt the operator or worker to move the checker 50 back to the initial position temporarily or once. Moreover, in case of reinserting the piped body 3 after the checker 50 has been moved back to the initial position, the lock confirmation function by the checker 50 is demonstrated in the same manner as having been demonstrated during the first or original insertion.

Moreover, if the reinsertion-inhibiting bosses 54 should have been turned into a tapered configuration toward the leading end and thereby the piped body 3 should have been reinserted under the aforementioned circumstances, the reinsertion-inhibiting bosses 54 come to deform on the leading end side. If such is the case, the reinsertion-inhibition bosses 54 of the checker 50 are confirmed or verified later, and thereby it is discernible that the insertion movement or action of the piped body 3 has been carried out without returning the checker 50 back to the initial position. However, even when the reinsertion-inhibiting bosses 54 should have been deformed at the leading end, it is necessary so as to make it possible to inhibit the insertion of the piped body 3 securely.

What is claimed is:

1. A quick connector to be coupled together with a piped body which is provided with an annular boss on a leading-end side thereof, the quick connector comprising:
    a tubular housing;
    a retainer formed integrally with or coupled together with said housing, the retainer locking to the annular boss of said piped body, which is inserted into the retainer through an opening thereof, thereby inhibiting said piped body from coming off; and
    a checker not only moved from an initial position to a lock confirmation position by a push-in operation, thereby confirming whether the annular boss of said piped body is put in a state of being locked to said retainer; but also moved from the lock confirmation position to a release position by a further push-in operation, thereby canceling the locking of said retainer to the annular boss;
    said checker including a reinsertion-inhibiting boss;
    the reinsertion-inhibiting boss hooked up onto the annular boss when said piped body is inserted through the opening of said retainer again in such a state as said checker is moved to the lock confirmation position, after said piped body has been pulled from out of said housing and said retainer in such a state as the checker is moved to the release position, thereby inhibiting said piped body from being inserted into said retainer and said housing; and
    the reinsertion-inhibiting boss being free of hooking up onto the annular boss in such a state as said checker is placed at the initial position and at the release position, thereby being free of inhibiting the insertion or pullout of said piped body into or from out of said housing and said retainer.

2. The quick connector as set forth in claim 1, wherein:
    said retainer includes:
        a retainer body having a first locker portion; and
        a retainer diametrically-enlarging claw disposed on an opening side of said retainer beyond the first locker portion of said retainer body, formed as a letter-"C" configuration being able to enlarge diametrically by elastic deformation, enlarging diametrically to make the annular boss of said piped body passable therethrough, and restoring the configuration to lock to the annular boss in the axial direction after the annular boss of said piped body has passed therethrough; and
    said reinsertion-inhibiting boss is arranged on an opening side of said retainer beyond the retainer diametrically-enlarging claw.

3. The quick as set forth in claim 2, wherein:
    said retainer further includes an opening-end seat member forming the opening through which said piped body is inserted; and
    said reinsertion-inhibiting boss is arranged in a middle axially between said retainer diametrically-enlarging claw and the opening-end seat member.

4. The quick connector as set forth in claim 3, wherein:
    said checker further includes a pair of clearance-intervention members intervening in an axial clearance between said retainer diametrically-enlarging claw and said opening-end seat member in such a state as said checker is placed at the lock confirmation position, thereby inhibiting said retainer diametrically-enlarging claw from deforming axially; and
    said reinsertion-inhibiting boss is disposed respectively so as to protrude from opposite-face sides of the paired clearance-intervention members to oppositely-facing sides thereof.

5. The quick connector as set forth in claim 4, wherein said retainer body includes a stopper inhibiting a distance between opposite faces of said paired clearance-intervention members from enlarging.

6. The quick connector as set forth in claim 4, wherein:
    said retainer body further includes a second locker portion; and
    said checker further includes a checker axially-deforming claw;
    the checker axially-deforming claw formed on a counter side against the opposite faces of said paired clearance-intervention members by way of a slit;
    the checker axially-deforming claw formed to be able to undergo flexure or deflection deformation axially on a leading-end side thereof;
    the checker axially-deforming claw inhibited from undergoing the flexure or deflection deformation by said retainer diametrically-enlarging claw in such a state as said retainer diametrically-enlarging claw is enlarged diametrically, thereby maintaining such a state as being locked to the second locker portion of said retainer body;
    the checker axially-de forming claw locked to the second locker portion of said retainer body, thereby being inhibited from moving from the initial position to the lock confirmation position in relative to the retainer body; and
    the checker axially-deforming claw turning into being able to cancel the locking to the second locker portion of said retainer body in such a state as said retainer diametrically-enlarging claw has re stored the configuration, thereby being able to move from the initial position to the lock confirmation position in relative to the retainer body.

* * * * *